United States Patent
Bihel et al.

(10) Patent No.: US 11,663,423 B1
(45) Date of Patent: May 30, 2023

(54) MULTI-BAND MULTI-ANTENNA RFID/OPTICAL DOCUMENT READER

(71) Applicant: Regula Ltd., Minsk (BY)

(72) Inventors: Siarhei Bihel, Minsk (BY); Andrey Ilyin, Minsk (BY); Aliaksandr Levanovich, Minsk (BY); Yury Rahazhynski, Minsk (BY); Ivan Shumsky, Minsk (BY)

(73) Assignee: Regula Forensics Inc., Reston, VA (US)

( * ) Notice: Subject to any disclaimer, the term of this patent is extended or adjusted under 35 U.S.C. 154(b) by 107 days.

(21) Appl. No.: 17/328,757

(22) Filed: May 24, 2021

Related U.S. Application Data

(60) Provisional application No. 63/030,449, filed on May 27, 2020.

(51) Int. Cl.
   *G06K 7/10* (2006.01)
(52) U.S. Cl.
   CPC ................ *G06K 7/10316* (2013.01)
(58) Field of Classification Search
   CPC .................................. G06K 7/10316
   USPC ....................................... 235/440
   See application file for complete search history.

(56) References Cited

U.S. PATENT DOCUMENTS

| | | | |
|---|---|---|---|
| 6,827,279 B2 * | 12/2004 | Teraura | B41J 11/009 235/382 |
| 7,889,360 B2 * | 2/2011 | Kiwada | H04N 1/32561 358/1.9 |

FOREIGN PATENT DOCUMENTS

RU      2575683 C2     2/2016

\* cited by examiner

*Primary Examiner* — Rafferty D Kelly
(74) *Attorney, Agent, or Firm* — Bardmesser Law Group

(57) ABSTRACT

A document reader including a housing having a lower portion and a rotatable upper lid; an optical reader located in the lower portion; a first RFID chip reader located in the lower portion, including a first RFID antenna configured for a first frequency of operation; a second RFID chip reader located in the rotatable, including a second RFID antenna configured for a second frequency of operation. The document reader first turns on the optical reader to detects and analyze a document placed between the lower portion and the rotatable upper lid, then turns on the second RFID chip reader to detect a second RFID chip in the document to read data from it at the second frequency, and then shuts off the second RFID chip reader, and then turns on the first RFID chip reader to detect a first RFID chip in the document to read data from it.

16 Claims, 7 Drawing Sheets

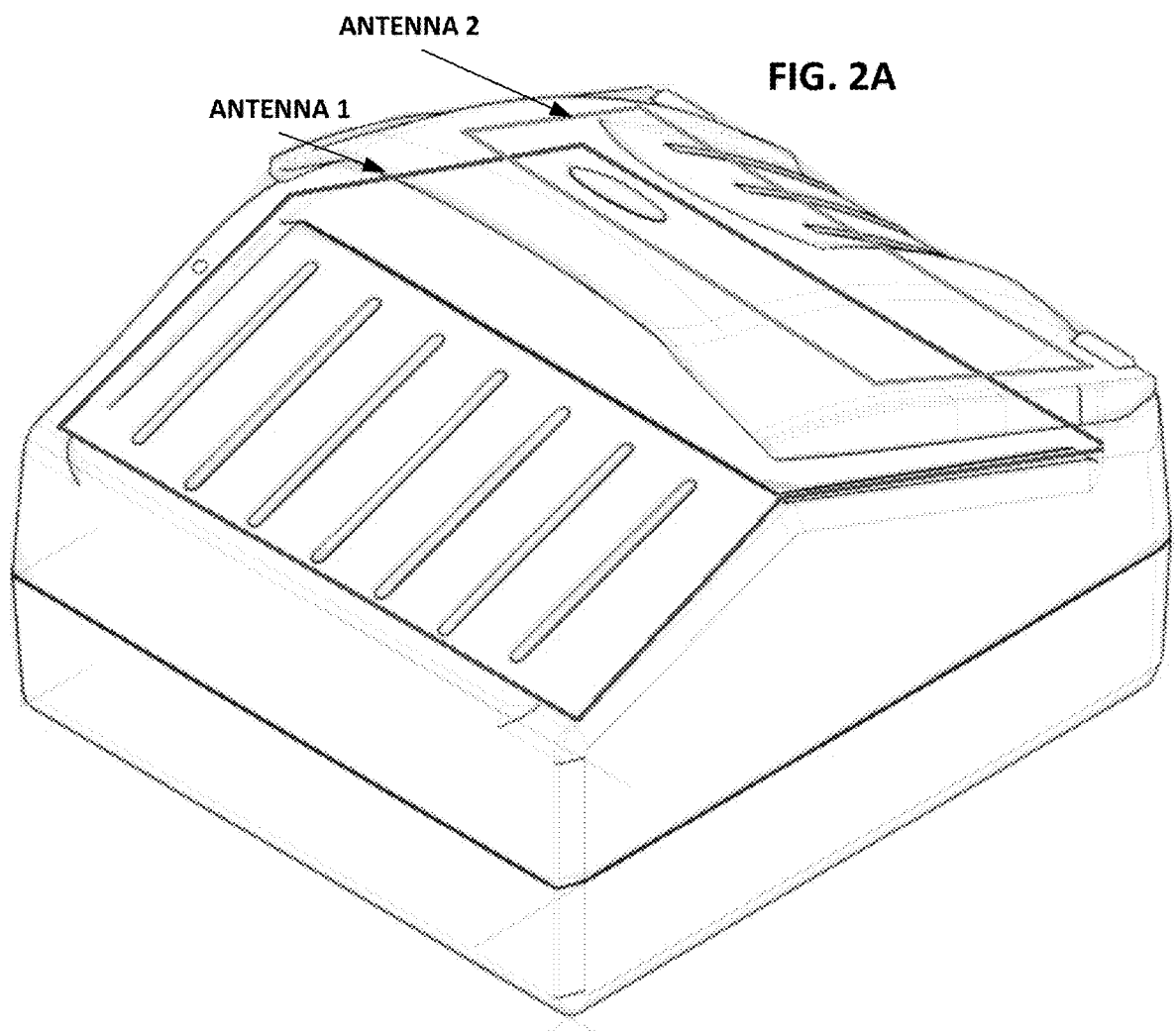

MULTI-BAND MULTI-ANTENNA RFID/OPTICAL DOCUMENT READER

CROSS REFERENCE TO RELATED APPLICATIONS

This application is a non-provisional of U.S. Patent Application No. 63/030,449, filed on May 27, 2020.

BACKGROUND OF THE INVENTION

Field of the Invention

The present invention is related to RFID/optical scanners, such as those used at airport and immigration checkpoints.

Description of the Related Art

The Radio-frequency identification (RFID) using chips embedded in documents have been used since first e-passport start circulating in 1998 in Malaysia. Since then, the technology has been adopted by many countries. However, while the specifications for RFID chip in e-Passports are regulated by ICAO, there are several documents/standards that use chips with different frequencies (Gen2 Chips). Examples of these documents are US Global Entry/Canadian Nexus cards and US permanent Resident Card. According to the specification, the chips in those documents can be read from a much greater distance (up to several meters) and require a different type of reading antenna.

The border control agencies that deal with the document usually have two separate devices, quite often separated by distance to overcome interference of two different RFID antennas in the two devices.

Operating two independent devices or manually controlling which antenna is in use at any given time is a time consuming and inconvenient process, which is undesirable for time sensitive environments, such as a Border Crossing point of a transportation hub, where the difference between accepted and non-accepted processing time can be as low as 500 milliseconds (0.5 seconds). Also, space at a border agent's station is often limited, and the need for multiple readers is inconvenient.

Accordingly, there is a need in the art for a system and method that addresses the above concerns.

SUMMARY OF THE INVENTION

The invention relates to a method and system for a dual band document reader that substantially obviates one or more of the disadvantages of the related art.

In one aspect, there is provided a document reader including a housing having a lower portion and a rotatable upper lid; an optical reader located in the lower portion; a first RFID chip reader located in the lower portion, including a first RFID antenna configured for a first frequency of operation; a second RFID chip reader located in the rotatable, including a second RFID antenna configured for a second frequency of operation. The document reader first turns on the optical reader to detects and analyze a document placed between the lower portion and the rotatable upper lid, then turns on the second RFID chip reader to detect a second RFID chip in the document to read data from the second RFID chip at the second frequency, and then shuts off the second RFID chip reader, and then turns on the first RFID chip reader to detect a first RFID chip in the document to read data from the first RFID chip.

The first RFID frequency is 13.56 MHz. The second RFID frequency is between 800 and 960 MHz. The reader includes an interface to a computer for transmitting the data read from the optical reader and the first and/or second RFID chip.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 2A shows the antennas for two transceivers, including one antenna in the cover and one antenna in the lower part of the body.

DETAILED DESCRIPTION OF THE PREFERRED EMBODIMENTS

Reference will now be made in detail to the preferred embodiments of the present invention, examples of which are illustrated in the accompanying drawings.

The proposed device and algorithm provide single housing device with two antenna modules. The proposed document verification algorithm enables co-operation of the two antennas side by side without affecting overall time, needed for processing the document.

The overall concept involves an algorithm that time-multiplexes the operation of antennas for transceivers working at different frequencies, taking into account data read by an optical reader when a document is available for the optical reader to scan. As long as there is no optical document detected by the optical reader, the algorithm cycles through the transceivers that do not require any keys being read (e.g., optically recognized characters, bar codes, QR codes, etc.) for their operation. If the RF transceiver detects a document, the data is read and send to a client application, and the next transceiver at a different frequency is tried.

When the optical reader detects and processes data from a document, the algorithm analyzes the data (i.e., document type, format, barcode or QR code, etc.), and selects one or more transceivers for sequentially reading the RF data from the document. If necessary, the algorithm matches the data from the optical reader to data from the RF transceiver. The data is then sent to a client application on a desktop. The algorithm then returns to the state where no optical document is detected.

Figure 1A:
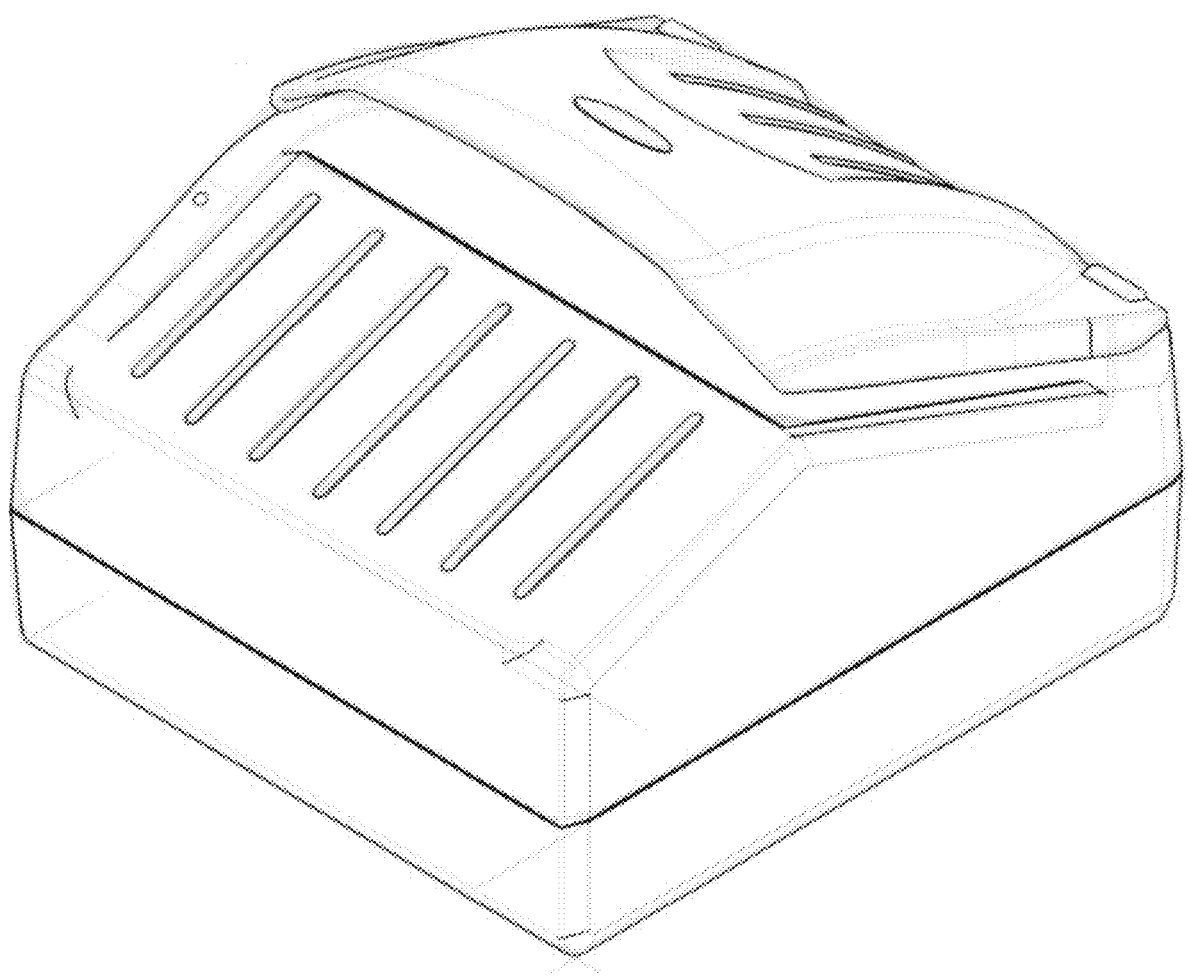
FIGS. 1A-1C shows different views of the reader.
Figure 1B:
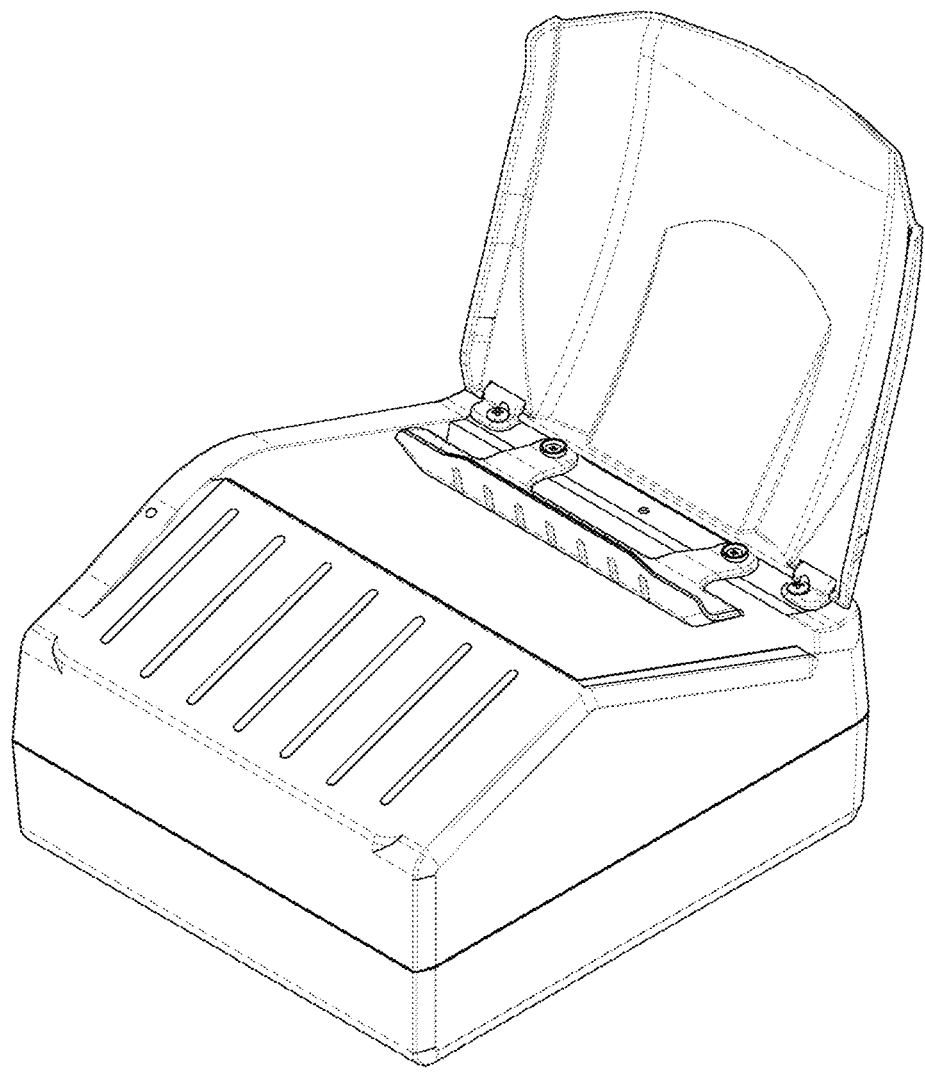
Figure 1C:
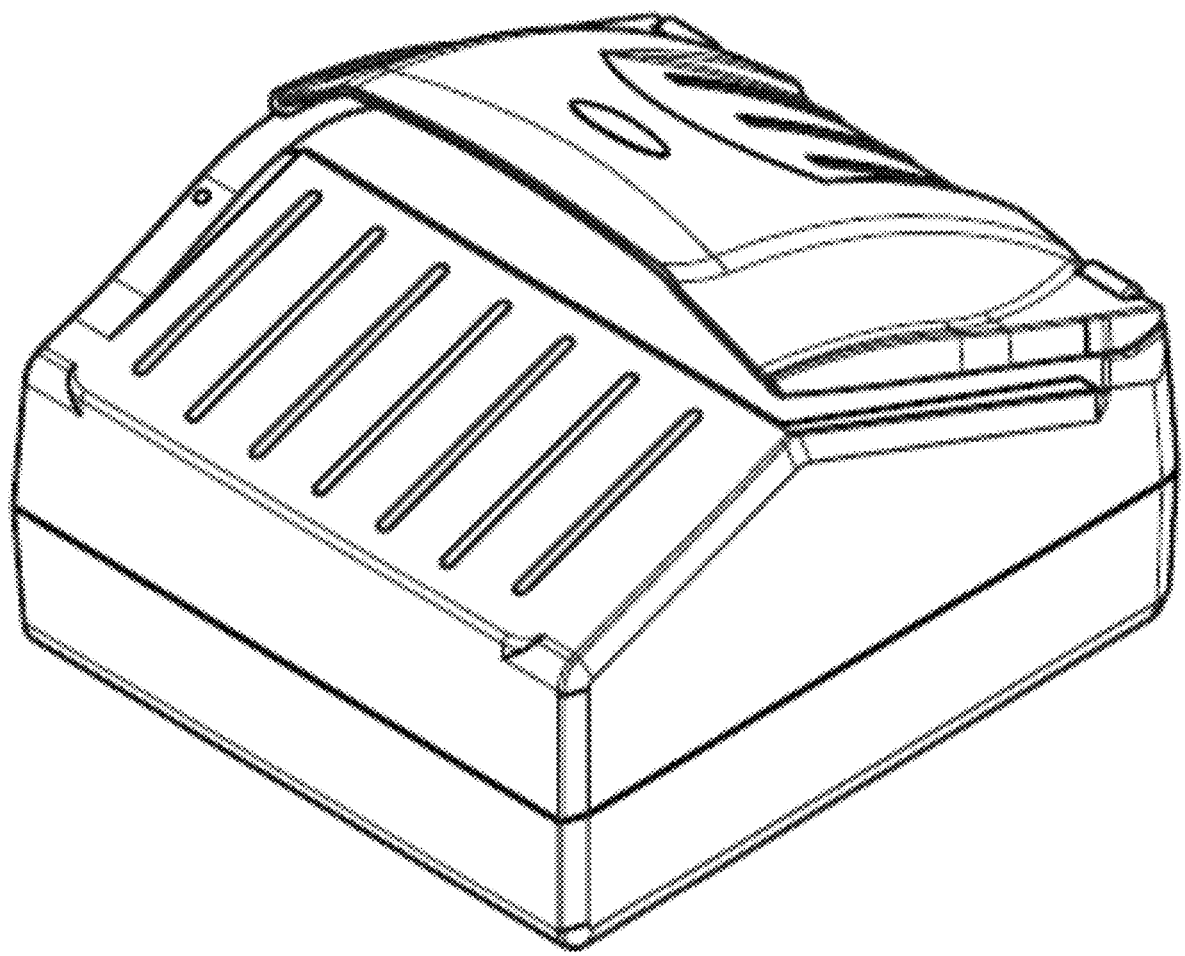
Figure 2B:
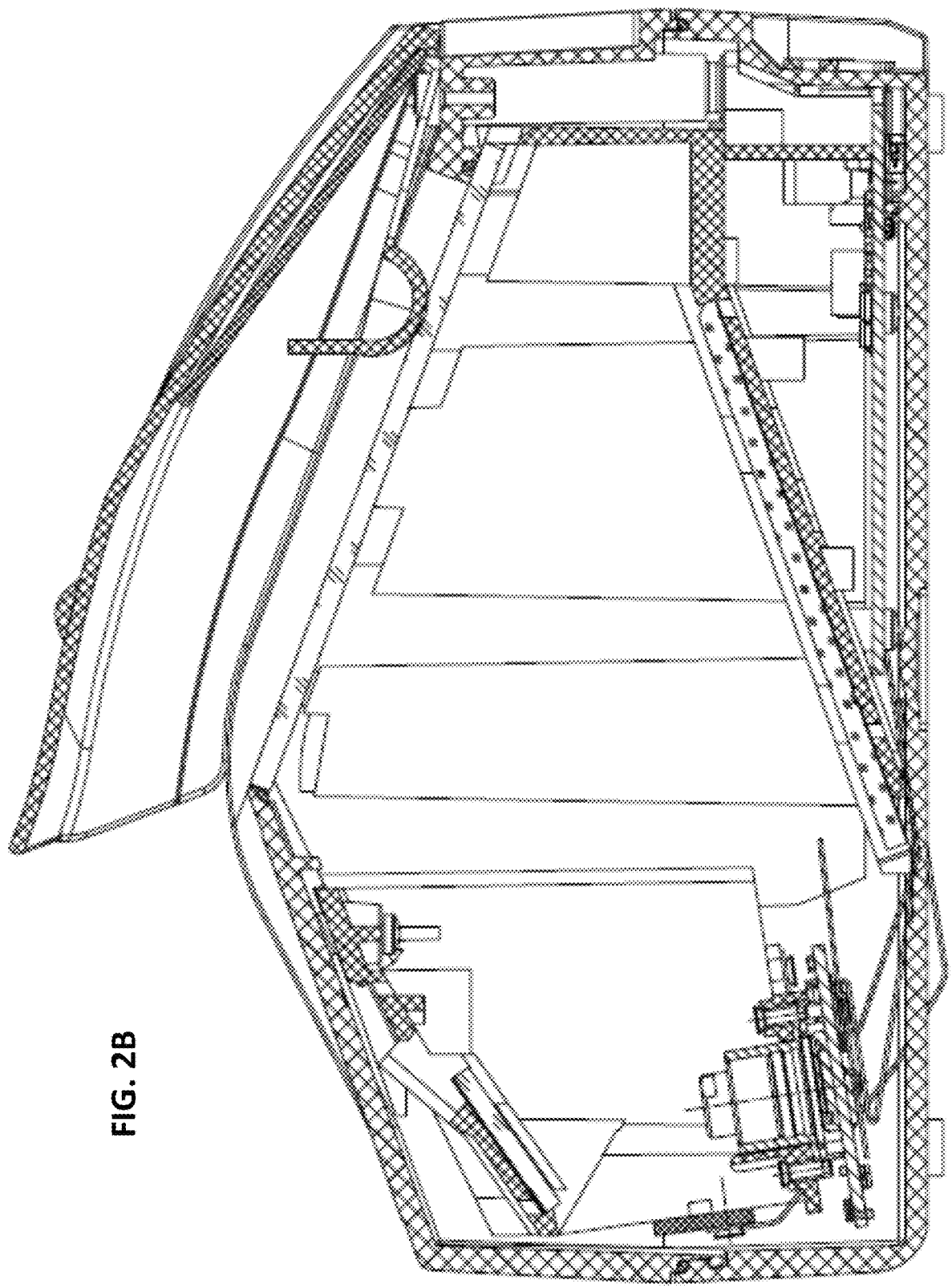
FIG. 2B shows a cross-sectional view of the reader.
Figure 3:
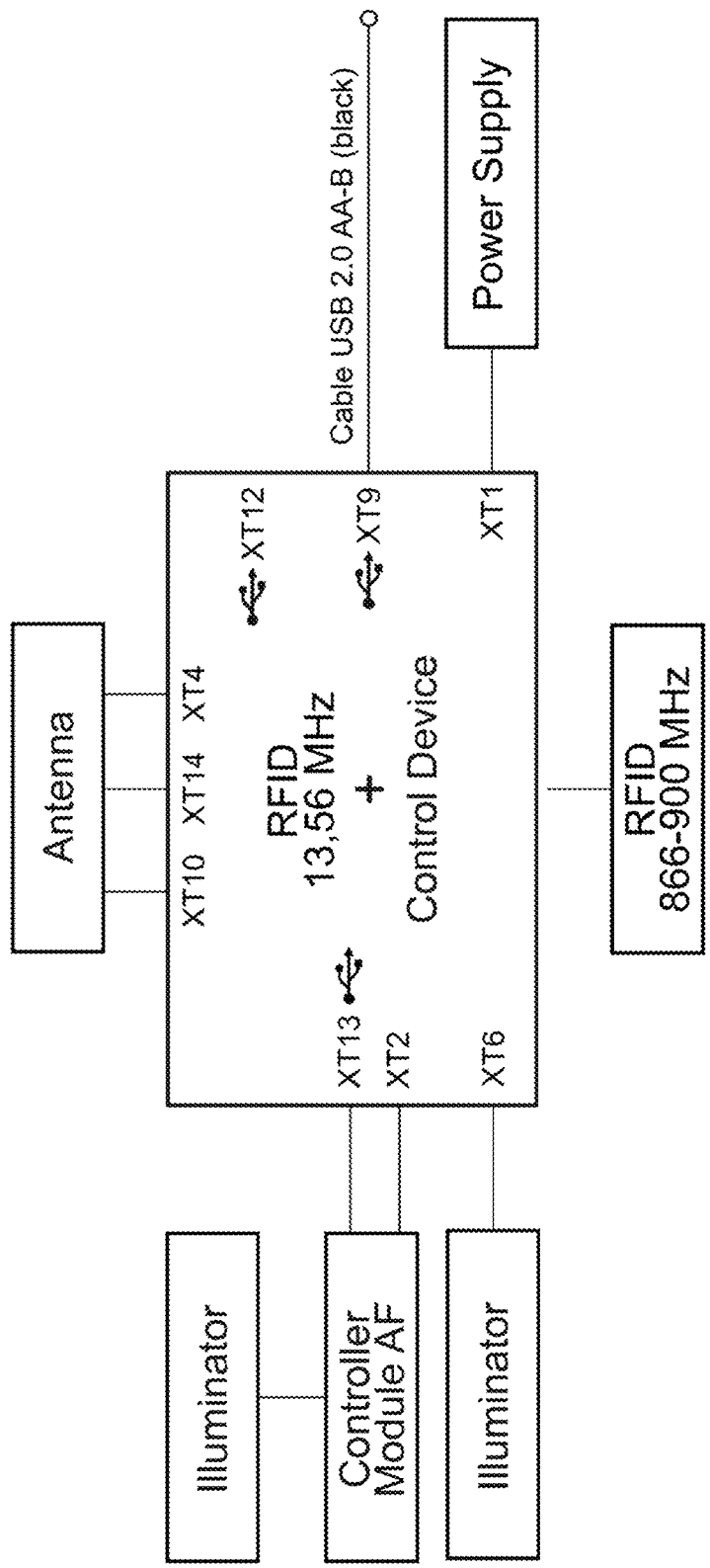
FIG. 3 shows a schematic of the document reader.

A document reader (see FIGS. 1A-1C) has an added RFID Module into the document cover (see FIG. 1B, showing the rotatable cover open). FIG. 2A shows the antennas for two transceivers, including one antenna in the cover and one antenna in the lower part of the body. Alternative arrangements are also possible, with both antennas in the housing, or both antennas in the cover, or two antennas in the lower body and one in the cover, for example. FIG. 2B shows the cross-section of the reader. A schematic of the new reader is shown in FIG. 3.

In this schematic, Illuminator and Controller Module AF (autofocus) refer to optical image capturing in different light sources. The "RFID 13.56 MHz and antenna" refers to an RFID antenna control module, used for reading e-Documents, whose functionality is regulated by ICAO standards. The "RFID 866-900 MHz" refers to RFID antenna module used to capture data from Gen2 chips. More generally, the driver can be for 840-960 MHz, e.g., the reader provides multi-protocol support for the 840-960 MHz UHF band compatible with ISO18000-62 & ISO18000-63, ISO29143 and to GS1's EPC UHF Gen2 air interface protocol. Other modules can be optimized for 125 KHz, specifically for 915 MHz and 2.4 GHz, as well as others.

In this module, the physical antenna is the part of the PCB board that is mounted in the cover (FIG. 2), while the 13.56 MHz antenna and circuitry is in the lower part of the housing (see FIG. 1E).

The power supply uses a 5V external power supply, needed for device operation. Cable USB is a cable to connect document reader with the personal computer. As is typical, all data processing is done on the personal computer side.

In one embodiment, because the detection range of Gen2 (900 MHz) chip is much larger than the detection range of 13.56 MHz RFID, in default mode the 900 MHz antenna is kept on in a "listening mode" while the 13.56 MHz antenna is off.

Some data in a Gen2 chip can be read without the need to have unlock keys from the optical part of document. If the antenna detects the presence of the Gen2 chip, it extracts available information and returns to the listening mode.

Upon detection of the presence of optical document, the system reads and verifies its data ("read optics"). The read optics module has its own algorithms for processing documents based on their design, data layout and security features. This module is run in parallel with RFID reading algorithm.

The read optics module and process also can provide access keys for (1) secured Gen2 chip fields and (2) Access codes to 13.56 MHz chip.

Figure 4:
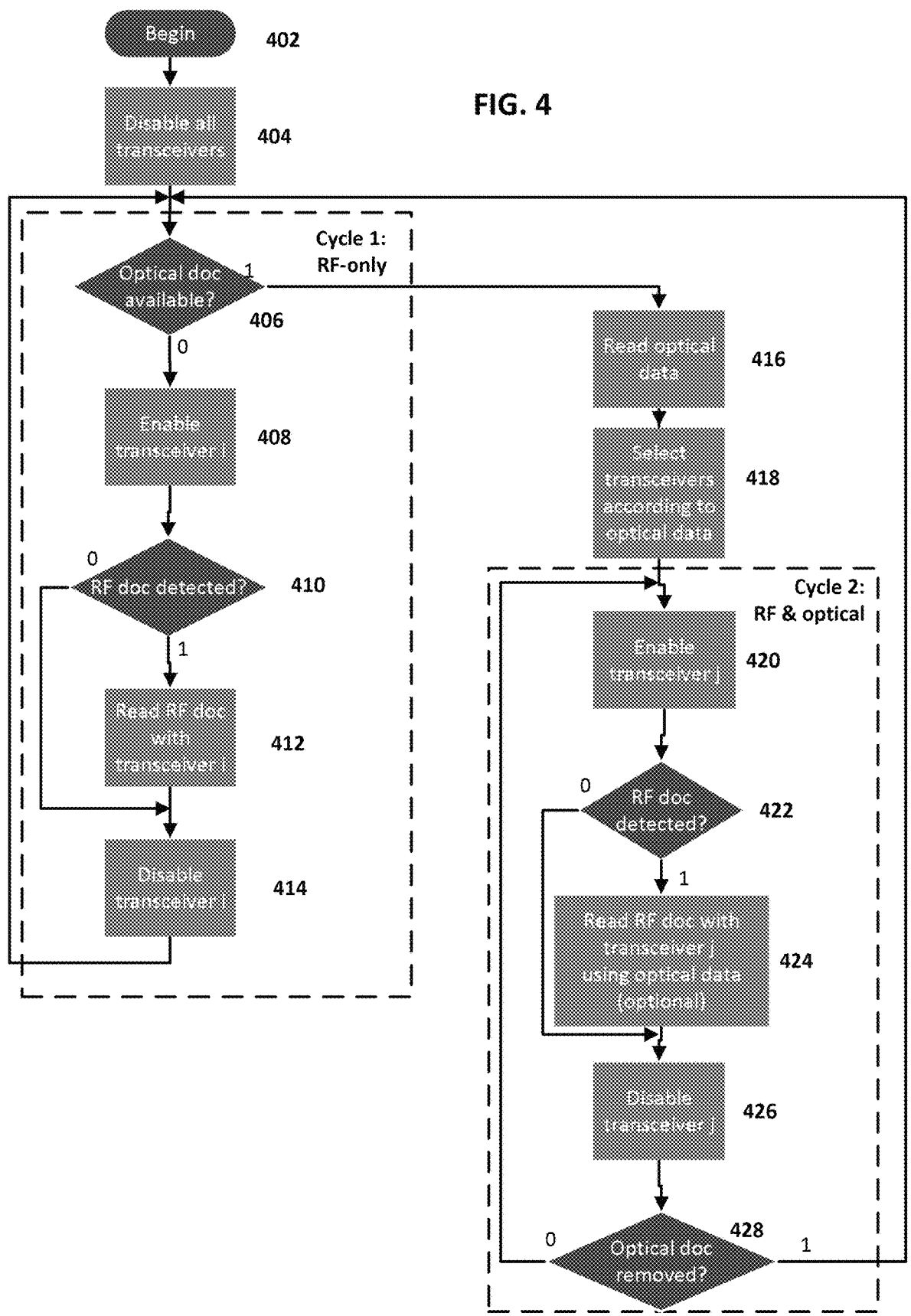
FIG. 4 shows a flow chart of the algorithm of operation of the reader.

If a Gen2 document is supplied, the system extracts additional data from the chip, updates document processing report, and returns to a listening mode (Read 900 MHz path in FIG. 4).

If no Gen2 document is being presented, the system automatically switches 900 MHz antenna off and enables 13.56 MHz antenna module to read data from 13.56 MHz chip according protocols, currently used as industry standards. The data is extracted and verified. The document processing report is updated, and system comes back to a listening mode. In this case the process consists on disabling 13.56 MHz antenna module and enabling 900 MHz antenna module. The enabling/disabling can be in either sequence (enable first, disable first, simultaneously).

If no e-document is presented (only the optical part is active, and the document has no RFID chip) or a chip is not detected in the documents, the system automatically updates the record and returns to a listening mode.

Specifically, with reference to FIG. 4, the algorithm executing in the reader that has multiple transceivers starts in step 402, and initially disables all transceivers (step 404). In step 406, the process detects if an optical document is available. If no such document is detected, the device proceeds to step 408, where the first transceiver is enabled.

In step 410, the device checks if it detects an RF document at the relevant frequency. If such a document is detected, the reader reads the document in step 412, and then disables the first transceiver (step 414). The reader then returns to step 406, and repeats the process for the second transceiver, and so on.

If, in step 406, an optical document is detected, then, in step 416, optical data is read. The correct transceiver is then selected based on the optical data read from the document by an optical reader (since the needed transceiver can now be identified), in step 418. The specific transceiver is enabled in step 420. The data is read by the transceiver in step 422. The transceiver is disabled in step 424. If the optical document is removed in step 426, the reader returns to step 406. Otherwise, the process returns to step 420, and another transceiver is used to read the document or the same transceiver if only one transceiver is known to apply to this document.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A document reader comprising:
   a housing having a lower portion and a rotatable upper lid;
   an optical reader located in the lower portion for scanning a document that faces down;
   a first RFID chip reader located in the lower portion, including a first RFID antenna configured for a first frequency of operation;
   a second RFID chip reader located in the rotatable upper lid, including a second RFID antenna configured for a second frequency of operation,
   wherein the document reader is configured to first turn on the optical reader to detect and analyze the document placed between the lower portion and the rotatable upper lid, then turn on the second RFID chip reader to detect an RFID chip in the document to read data from the RFID chip at the second frequency, then shut off the second RFID chip reader, and then turn on the first RFID chip reader to detect the RFID chip in the document to read data from the RFID chip, and
   wherein the first frequency is different than the second frequency.

2. The document reader of claim 1, wherein the first RFID frequency is 13.56 MHz.

3. The document reader of claim 1, wherein the second RFID frequency is between 800 and 900 MHz.

4. The document reader of claim 1, wherein the second RFID frequency is 915 MHz.

5. The document reader of claim 1, wherein the second RFID frequency is 2.4 GHz.

6. The document reader of claim 1, wherein the first RFID frequency is 13.56 MHz and the second RFID frequency is 125 KHz.

7. The reader of claim 1, wherein the second RFID frequency is 840-960 MHz.

8. The document reader of claim 1, further comprising an interface to a computer for transmitting the data read from the optical reader and the RFID chip.

9. The document reader of claim 1, wherein the first RFID frequency is between 800 and 960 MHz, and the second RFID frequency is 13.56 MHz.

10. The document reader of claim 1, wherein the first RFID chip reader includes a first radio transceiver, and the second RFID chip reader includes a second radio transceiver.

11. The document reader of claim 1, further comprising a third RFID chip reader located in the lower portion, including a third RFID antenna configured for a third frequency of operation, wherein the third RFID chip reader is turned on after the first and second RFID chip readers.

12. The document reader of claim 1, further comprising a third RFID chip reader located in the rotatable upper lid, including a third RFID antenna configured for a third frequency of operation, wherein the third RFID chip reader is turned on after the first and second RFID chip readers.

13. The document reader of claim 1, further comprising a third RFID chip reader located in the lower portion, including a third RFID antenna configured for a third frequency of operation, wherein the third RFID chip reader is turned on after the first and second RFID chip readers, and a fourth RFID chip reader located in the rotatable upper lid, including a fourth RFID antenna configured for a fourth frequency of operation, wherein the fourth RFID chip reader is turned on after the first, second and third second RFID chip readers.

14. The document reader of claim 13, wherein the third RFID chip reader includes a third radio transceiver, and the fourth RFID chip reader includes a fourth radio transceiver.

15. The document reader of claim 1, further comprising wherein the document reader turns on only the first RFID chip reader or only the second RFID chip reader based on analysis of data from the optical reader.

16. A document reader comprising:
a housing having a rotatable upper lid;
an optical reader located below the rotatable upper lid for scanning a document that faces down;
a first RFID chip reader located below the rotatable upper lid, including a first RFID antenna configured for a first frequency of operation;
a second RFID chip reader located in the rotatable upper lid, including a second RFID antenna configured for a second frequency of operation,
wherein, for a document placed between the lower portion and the rotatable upper lid, the document reader is configured to first turn on the second RFID chip reader to detect an RFID chip in the document to read data from the RFID chip at the second frequency, then shut off the second RFID chip reader, then turn on the optical reader to detect and analyze the document, and, based on the analysis, then turn on the first RFID chip reader to detect the RFID chip in the document to read data from the RFID chip at the first frequency, and
wherein the first frequency is different than the second frequency.

* * * * *